Nov. 20, 1962 M. W. CONNELL 3,065,286

THERMOCOUPLE UNIT

Filed July 25, 1958 2 Sheets-Sheet 1

INVENTOR.
Maurice W. Connell,
BY Popp and Sommer
ATTORNEYS.

Nov. 20, 1962 M. W. CONNELL 3,065,286
THERMOCOUPLE UNIT
Filed July 25, 1958 2 Sheets-Sheet 2
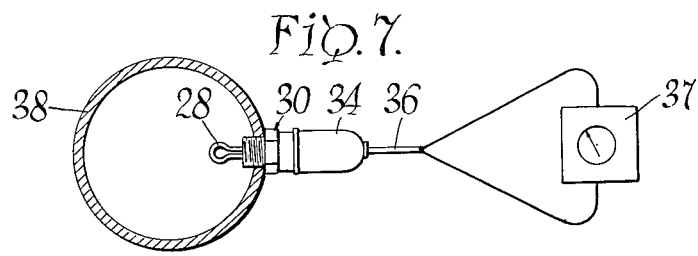
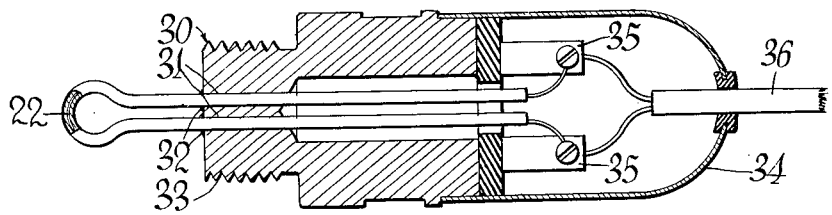
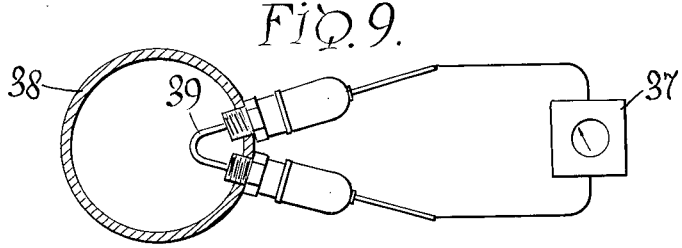
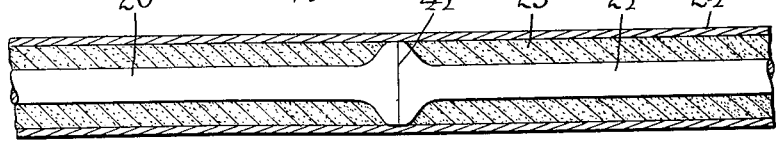
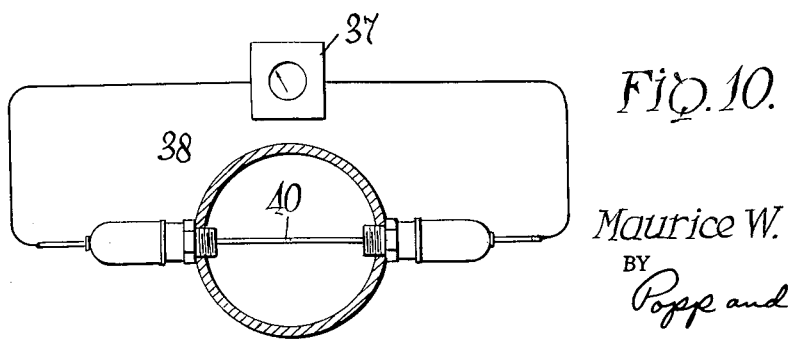
INVENTOR.
Maurice W. Connell,
BY
Popp and Sommer
ATTORNEYS.

United States Patent Office 3,065,286
Patented Nov. 20, 1962

3,065,286
THERMOCOUPLE UNIT
Maurice W. Connell, Clarence Center, N.Y., assignor to Conax Corporation, Buffalo, N.Y., a corporation of New York
Filed July 25, 1958, Ser. No. 751,002
3 Claims. (Cl. 136—4)

This invention relates to an improved construction of thermocouple unit and the method of making the same.

Thermocouples for the conversion of heat energy into electrical energy are well known and are used for such purposes as determining the temperatures of fluids, whether liquid or gaseous in nature, in a vessel or container. Thermocouples involve the joining of two dissimilar metals to form a hot junction to which heat is applied, as for example a hot fluid the temperature of which is to be sensed. The temperature differential between the hot junction and the remote and relatively cold terminals of the metals determines the amount of electrical energy generated which can be measured by a galvanometer or other electrical indicating or recording or measuring instrument, all as is well known to those skilled in this art.

An object of the present invention is to provide a thermocouple unit which has a high speed of response.

Another object is to provide a thermocouple unit which is safeguarded against the effects of vibration to which it might be subjected and thereby increase its useful life and prevent inoperativeness.

Another object is to provide such a thermocouple unit which has a high resistance against being burned out.

A further object is to provide such a thermocouple unit which is non-crushable and therefore may be inserted into fluid mediums under extremely high pressures.

A further aim is to provide such a thermocouple unit which is adaptable for different modes of installation.

Another object is to provide a thermocouple which, while having all of the foregoing advantages, is simple in construction and easy and inexpensive to manufacture.

Other objects and advantages of the present invention will be apparent from the following description and accompanying drawings in which:

FIGS. 1 through 5 depict the steps followed in the manufacture of an improved thermocouple unit constructed in accordance with the principles of the present invention; FIG. 1 showing two wires of dissimilar metals before connection together; FIG. 2 showing such wires after they have been butt welded together to form a thermocouple element; FIG. 3 showing the thermocouple element on which a tubular sleeve of mineral insulation material has been slid, the sleeve being shown in section; FIG. 4 showing a metal sheath surrounding the mineral insulated thermocouple element and placed there by sliding the same over the mineral insulation, the sleeve and sheath being shown in section; and FIG. 5 showing the aforementioned loose assembly in elevational view being swaged or drawn to reduce its outside diameter.

FIG. 7 shows the improved thermocouple unit bent into hairpin form and illustrated typically as a temperature probe mounted on a pipe and immersed in a fluid within the pipe and associated with a suitable temperature indicating instrument.

FIG. 8 is an enlarged sectional view through the mounting means illustrated in FIG. 7.

FIG. 9 illustrates a modified installation of the thermocouple unit.

FIG. 10 illustrates a still further modified installation of the thermocouple unit.

FIG. 11 is a ivew similar to FIG. 6 but showing a grounded type of thermocouple unit.

Figure 6:
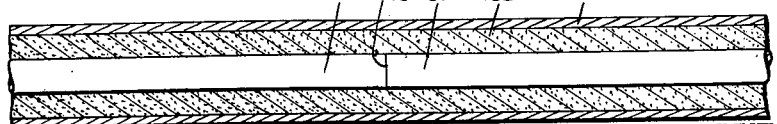
FIG. 6 is a longitudinal central sectional view of the thermocouple unit resulting from the foregoing method of manufacture and embodying the present invention.

Referring to FIG. 6, the thermocouple unit of the present invention is shown as comprising two wires 20 and 21 composed severally of different metals, butt welded together as indicated at 22 to provide a hot junction, surrounded by a body 23 of compacted and voidless mineral insulation material, in turn surrounded by a metal sheath 24.

Figure 1:
Figure 2:
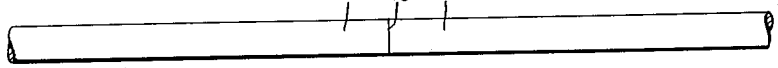

The wires 20 and 21 are preferably of the same diameter and may be Chromel and Alumel severally, or any other suitable thermocouple junction may be used, such as a copper-to-constantan couple or an iron-to-constantan couple. The present invention is not limited to any particular combination of metals or metal alloys. The opposing ends of the wires are preferably squared off and then butt welded together in well known manner to provide the hot junction 22, as illustrated by FIGS. 1 and 2.

Figure 3:
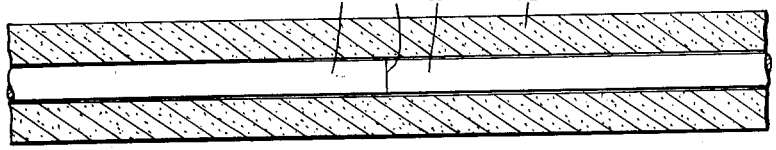

The insulating body 23 surrounding the thermocouple element 20, 21, 22 is preformed as a tubular sleeve-like member 25 (FIG. 3) made of any deformable and crushable mineral material such as aluminum oxide, or uncured or green lava. The preformed insulation 25 has a bore slightly larger in diameter than the joined wires 20 and 21 so that it may be easily slid thereover as depicted in FIG. 3. It will be noted that the preformed insulation 25 extends over the hot junction 22 and is compacted firmly around the thermocouple element to eliminate all voids during manufacture of the unit.

Figure 4:
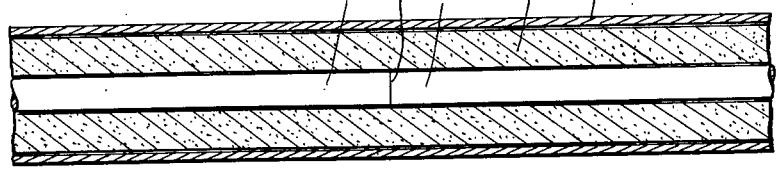

The metal sheath 24 is initially a tube 26 (FIG. 4) of any suitable metal or alloy, such as stainless steel, having a bore slightly larger in diameter than the outside diameter of the preformed insulating sleeve member 25 so that the tube may be readily slipped over the insulating member, as depicted in FIG. 4.

Figure 5:
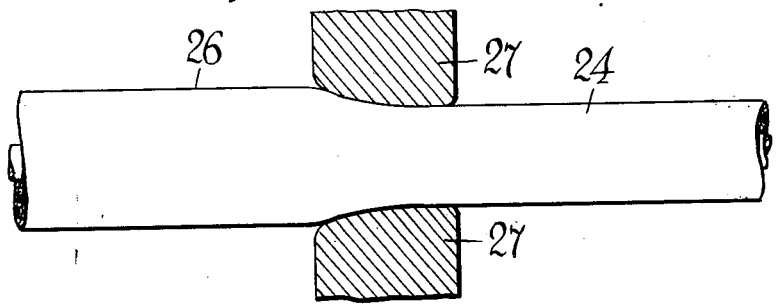

The loosely fitting assembly shown in FIG. 4 is then reduced in diameter, by swaging operation or drawing through a die, as depicted in FIG. 5 in which the numeral 27 represents a die or swaging tool. Any suitable machine may be used for this purpose. In the process of diameter reduction, the mineral insulating member 25 is crushed and compressed around the wires 20 and 21 and also the hot junction 22. The reduction in outside diameter of the metal tube 26 is in the order of 30%. If this diameter reduction is accomplished by swaging the wall thickness of the sheath 24 increases as compared to that of the tube 26, but decreases if the operation is accomplished by drawing. In either case, diameter reduction of the wires 20 and 21 is slight, and in both cases reduction in the wall thickness of the preformed insulating member 25 to its final form 23 is great. The finished thermocouple unit is shown in FIG. 6 and in which the metal sheath 24 holds the mineral body 23 compressively around the thermocouple element throughout its length and in which this element is effectively insulated from the surrounding metal sheath. It is to be noted that the hot junction 22 is buried in the surrounding voidless insulation.

After the thermocouple unit is so formed the hot junction 22 may be located by connecting the lead wires to a suitable instrument and sliding a small soldering iron along the outer sheath until the instrument indicates a temperature rise. The hot junction is easily bracketed and precisely located.

The thermocouple unit may then be bent back on itself into hairpin form 28 as shown in FIG. 7, so that the legs of the unit run parallel with a loop being formed which has the hot junction at its outmost point. A suitable fitting may then be employed for installing the thermocouple unit.

Such a fitting is shown in FIG. 8 as comprising a body 30 having a pair of closely spaced holes 31 through which the legs of the thermocouple unit extend, leaving the looped end of the unit exposed. The holes 31 may be sealed to the legs by welding or soldering as indicated at 32. The body 30 has an external mounting thread 33 at one end and is formed at its other end to removably receive a cap 34 which covers a terminal head assembly. This assembly includes a pair of terminals 35, 35 suitably mounted on and insulated from the end of the body 30. The ends of the wires 20 and 21, remote from the hot junction which is in the loop, are bared and connected to the terminals 35 to which are also connected the ends of a two conductor lead in wire 36. The other end of this lead in wire 36 extends to a suitable measuring instrument 37 as shown in FIG. 7 from which it will also be seen that the fitting with attached thermocouple unit can be mounted on a pipe 38 by screwing the thread 33 into a threaded hole provided in the pipe 38. This pipe is assumed for illustrative purposes to contain a hot fluid the temperature of which is to be sensed by the immersed hot junction of the thermocouple unit and indicated by the instrument 37.

Instead of bending the thermocouple unit into hairpin form, it may be bent only partially so that its legs extend away from the hot junction in divergent manner, as illustrated at 39, in FIG. 9. In this case two fittings would be required, one for each end of the thermocouple unit, and each may be similar to that shown in FIG. 8 but modified only to have one hole 31 since only a single leg of the unit passes through the fitting.

If desired, the thermocouple unit need not be bent at all but may extend straight across a pipe or vessel as illustrated at 40 in FIG. 10. Here the hot junction is intermediate the fittings which could be the same as those used for the installation shown in FIG. 9.

Of course, any termination means for the thermocouple unit other than the illustrative fitting disclosed, may be used.

These various typical installations indicate the flexibility inherent in the improved thermocouple unit in adapting it for mounting as desired or necessitated. It will also be seen that the present invention provides a thermocouple unit which is vibration proof, fast in response, resistive to burning out, non-crushable, and easy and inexpensive to manufacture.

If even greater sensitivity is desired, the hot junction of the thermocouple unit may be grounded. This can be conveniently accomplished by upsetting the hot junction when the weld is made providing a slightly larger diameter at the hot junction than through the rest of the wire element, as shown at 41, in FIG. 11. In making this grounded type of unit, the same steps previously described may be followed except that pieces of preformed tubular insulation are slid over the wires from their outer ends to the point of upset. When the outer sheath is later reduced in diameter, by swaging or drawing, it makes firm metallic contact with the periphery of the upset portion of the hot junction as well as compressing the insulation.

I claim:

1. A thermocouple unit, consisting of a thermocouple element including a pair of wires of dissimilar metals butt welded together to provide a hot junction, a metal sheath surrounding said element, said element extending longitudinally of and substantially centrally through said sheath as a single strand, and mineral insulation filling the space between said element and sheath and maintained in a compacted state by said element and sheath.

2. A thermocouple unit according to claim 1 in which said hot junction is buried in said insulation.

3. A thermocouple unit according to claim 1 in which said hot junction is enlarged and firmly contacts said sheath.

References Cited in the file of this patent

UNITED STATES PATENTS

| | | |
|---|---|---|
| 964,961 | Fisher | July 19, 1910 |
| 2,000,489 | Lederer | May 7, 1935 |
| 2,029,922 | Finch | Mar. 3, 1953 |
| 2,757,220 | Carter | July 31, 1956 |
| 2,768,424 | Andrus | Oct. 30, 1956 |
| 2,793,420 | Johnson et al. | May 28, 1957 |
| 2,794,062 | McCall | May 28, 1957 |
| 2,844,637 | Borel et al. | July 22, 1958 |
| 2,849,518 | MacDonald | Aug. 26, 1958 |
| 2,924,974 | Dalglish | Feb. 16, 1960 |

FOREIGN PATENTS

| | | |
|---|---|---|
| 674,068 | Great Britain | June 18, 1952 |
| 893,077 | France | Apr. 2, 1943 |